United States Patent Office 3,440,250
Patented Apr. 22, 1969

3,440,250
DISUBSTITUTED ALCOHOLS SUBSTITUTED BY A NAPHTHYL RADICAL
Etienne Szarvasi, and Michel Bayssat, Lyon, France, assignors to Lipha, Lyonnaise Industrielle Pharmaceutique
No Drawing. Original application Mar. 18, 1964, Ser. No. 352,963, now Patent No. 3,334,096, dated Aug. 1, 1967. Divided and this application Nov. 8, 1966, Ser. No. 592,755
Int. Cl. C07d 5/16, 5/20
U.S. Cl. 260—347.8    4 Claims

ABSTRACT OF THE DISCLOSURE

New disubstituted alcohols having the formula:

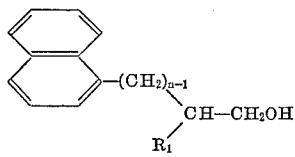

wherein $n$ is an integer at most equal to 2; and $R_1$ is a member of the group consisting of the tetrahydrofurfuryl radical when $n=2$, and a straight chain alkenyl radical containing 3 or 4 carbons when $n=1$.

---

This application is a divisional application of application Ser. No. 352,963 filed Mar. 18, 1964, now Patent No. 3,334,096.

This invention relates to novel disubstituted alcohols and their production.

The compounds with which the invention is concerned are the disubstituted alcohols represented by the general formula

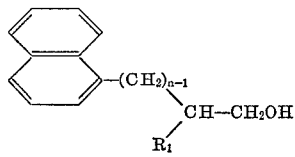

wherein $n$ is an integer at most equal to 2; and $R_1$ is a member of the group consisting of the tetrahydrofurfuryl radical when $n=2$, and a non-saturated aliphatic radical containing 3 to 4 carbon atoms when $n=1$.

The above disubstituted alcohols are obtained by a process consisting in the reduction of an ester corresponding to the desired alcohol. According to a preferred modification, the aforesaid alcohols are prepared by reduction of a methyl ester by lithium-aluminium hydride in an inert solvent.

These new alcohols are capable of particular usage as intermediate products in the obtaining of the new ether oxides described and claimed in the copending application Ser. No. 592,730 filed on the same day as the present application now Patent No. 3,347,858, also a division of application Ser. No. 352,963.

The following non-limitative examples illustrate the invention.

EXAMPLE 1

β-(1-naphthyl)-β'-tetrahydrofuryl-1-isobutanol $C_{18}H_{22}O_2$         M=270.36

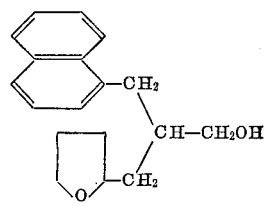

14 g. (0.37 mol) of LiAlH$_4$ and 1600 cc. of dry ether are placed in a spherical flask equipped with a mechanical stirrer device, a reflux condenser and a dropping funnel. 120 g. (0.41 mol) of methyl-β-(1-naphthyl)-β'-tetrahydrofuryl isobutyrate in solution in 120 cc. of ether are introduced dropwise into the flask by means of the dropping funnel.

The speed of addition is regulated in such a way that the ether is caused to boil gently. The duration of the addition is 1 hour 25 minutes. The yellow mixture is heated under reflux for 4 hours. The complex which forms is decomposed by carefully adding dropwise 320 cc. of water and then 600 cc. of 10% H$_2$SO$_4$.

After extraction with ether and drying the extract over Na$_2$SO$_4$, distillation yields 89 g. of viscous yellow liquid with a B.P. $_{0.95 \text{ millibar}}$=184–185° C. The yield is 82% (theoretical quantity=108.5 g.).

The redistilled product is analytically pure and has the following constants:

B.P. $_{0.816 \text{ millibar}}$ _____ ° C__   179
Refractive index $n_D^{24.5}$ _____   1.595
Acidity index:
   Calculated _____   207
   Found _____   211

Gravimetric analysis.—Calculated: C, 79.96%; H, 8.20%. Found: C, 79.95%; H, 7.95.

β-(1-naphthyl)-β'-tetrahydrofuryl isobutanol phenyl urethane $C_{25}H_{27}O_3N$

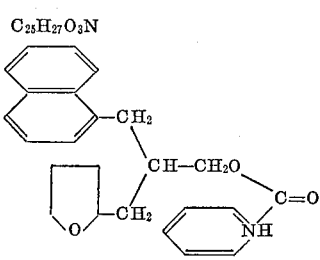

Melting point=108–110° C. After recrystallisation from carbon tetrachloride, the product is analytically pure.

Gravimetric analysis.—Calculated: N, 3.60%. Found: N, 3.65%.

EXAMPLE 2

α-(1-naphthyl)-Δ-hex-4-en-1-ol $C_{16}H_{18}O$  M=226.30

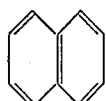

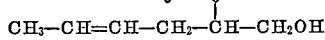
$CH_3-CH=CH-CH_2-CH-CH_2OH$ 3.5 g. (0.095 mol) of lithium-aluminium hydride and 400 cc. of anhydrous ether are placed in a fluid-tight and dry apparatus and 25.5 g. (0.10 mol) of methyl-α-(1-naphthyl)-hexenoate in 50 cc. of anhydrous ether are introduced dropwise thereinto by means of dropping funnel. The speed of addition is regulated in such manner that the ether is caused to boil gently. The duration of the addition is 40 minutes. The mixture is heated under reflux for 2 hours. The decomposition of the complex is effected by adding 80 cc. of water and then 150 cc. of 10% $H_2SO_4$.

The ethereal layer is dried and then distilled, and the desired product is obtained in the form of a light yellow liquid, with a quantitative yield.

The product has the following constants:

| | |
|---|---|
| B.P. $_{1.36\ \text{millibar}}$ ° C | 136 |
| Refractive index $n_D^{21}$ | 1.604 |
| Density, $d_4^{21.5}$ | 1.0493 |
| Acidity index: | |
| Calculated | 247 |
| Found | 237 |

*Gravimetric analysis.*—Calculated: C, 84.92%; H, 8.01%. Found: C, 84.86%; H, 7.86%.

Phenyl urethane $C_{23}H_{23}NO_2$  M=345.41

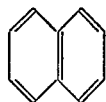

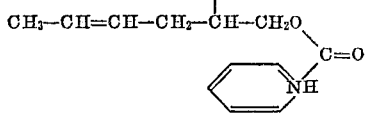

10 g. of the product as obtained above are added to 5 g. of phenyl isocyanate. The liquid is heated and the exothermic reaction lasts about 10 minutes. After standing overnight, a white slightly pasty solid is isolated, and this is recrystallised from 60 cc. of carbon tetrachloride. 6.5 g. of white crystals are obtained, with a melting point of 75–77° C. (heating stage).

*Gravimetric analysis.*—Calculated: C, 79.98%; H, 6.71%; N, 4.66%. Found: C, 79.44%; H, 6.77%; N, 4.03%.

EXAMPLE 3

α-(1-naphthyl)-Δ-pent-4-en-1-ol $C_{15}H_{16}O$  M=212.28

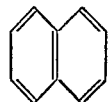

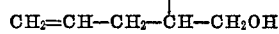
$CH_2=CH-CH_2-CH-CH_2OH$ 27.5 g. (0.114 mol) of methyl α-(1-naphthyl)-Δ-pent-4-enoate in solution in 55 cc. of ether are introduced into a mixture of 4.5 g. (0.115 mol) of lithium-aluminium hydride and 500 cc. of dry ether. The period of addition lasts 30 minutes. Heating under reflux takes place for 4 hours. The decomposition of the complex is effected by adding 105 cc. of water and 195 cc. of 10% $H_2SO_4$.

Distillation yields 18.5 g. of an opaque liquid with a B.P. $_{0.815\ \text{millibar}}$=126–127° C. The yield is 76.5% (theoretical quantity=24.2 g.).

The redistilled product is analytically pure and has the following constants:

| | |
|---|---|
| B.P. $_{0.544\ \text{millibar}}$ ° C | 124–125 |
| $d_4^{25}$ | 1.045 |
| $n_D^{26}$ | 1.607 |
| Acidity index: | |
| Calculated | 263 |
| Found | 260 |

*Gravimetric analysis.*—Calculated: C, 84.89%; H, 7.60%. Found: C, 84.44%; H, 7.62%.

The new alcohols of the present application are intermediate products in the synthesis of the new ether oxides endowed with antispasmodic and local anesthetic activity, and of their addition salts endowed with peripheral and coronary vasodilatory activity, disclosed and claimed in our copending application Ser. No. 592,730, now Patent No. 3,347,858, filed on the same day as the present application, the disclosure of which is incorporated herewith by reference.

What we claim is:

1. An alcohol of the formula

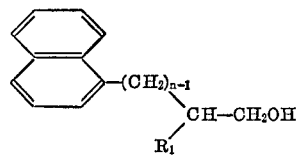

wherein
n is an integer at most equal to 2; and
$R_1$ is a member of the group consisting of the tetrahydrofurfuryl radical when n=2, and a straight chain alkenyl radical containing 3 to 4 carbon atoms when n=1.

2. β-(1-naphthyl)β'-(2-tetrahydrofuryl)-1-isobutanol.
3. α-(1-naphthyl)-Δ-hex-4-en-1-ol.
4. α-(1-naphthyl)-Δ-pent-4-en-1-ol.

References Cited

UNITED STATES PATENTS 3,347,858  10/1967  Szarvasi et al. _____ 260—297.2

OTHER REFERENCES

Fieser and Fieser: Advanced Organic Chem., N.Y., Reinhold (1961), pp. 278–9.

ALEX MAZEL, *Primary Examiner.*

B. I. DENTZ, *Assistant Examiner.*

U.S. Cl. X.R.

260—618